United States Patent Office 3,509,703
Patented May 5, 1970

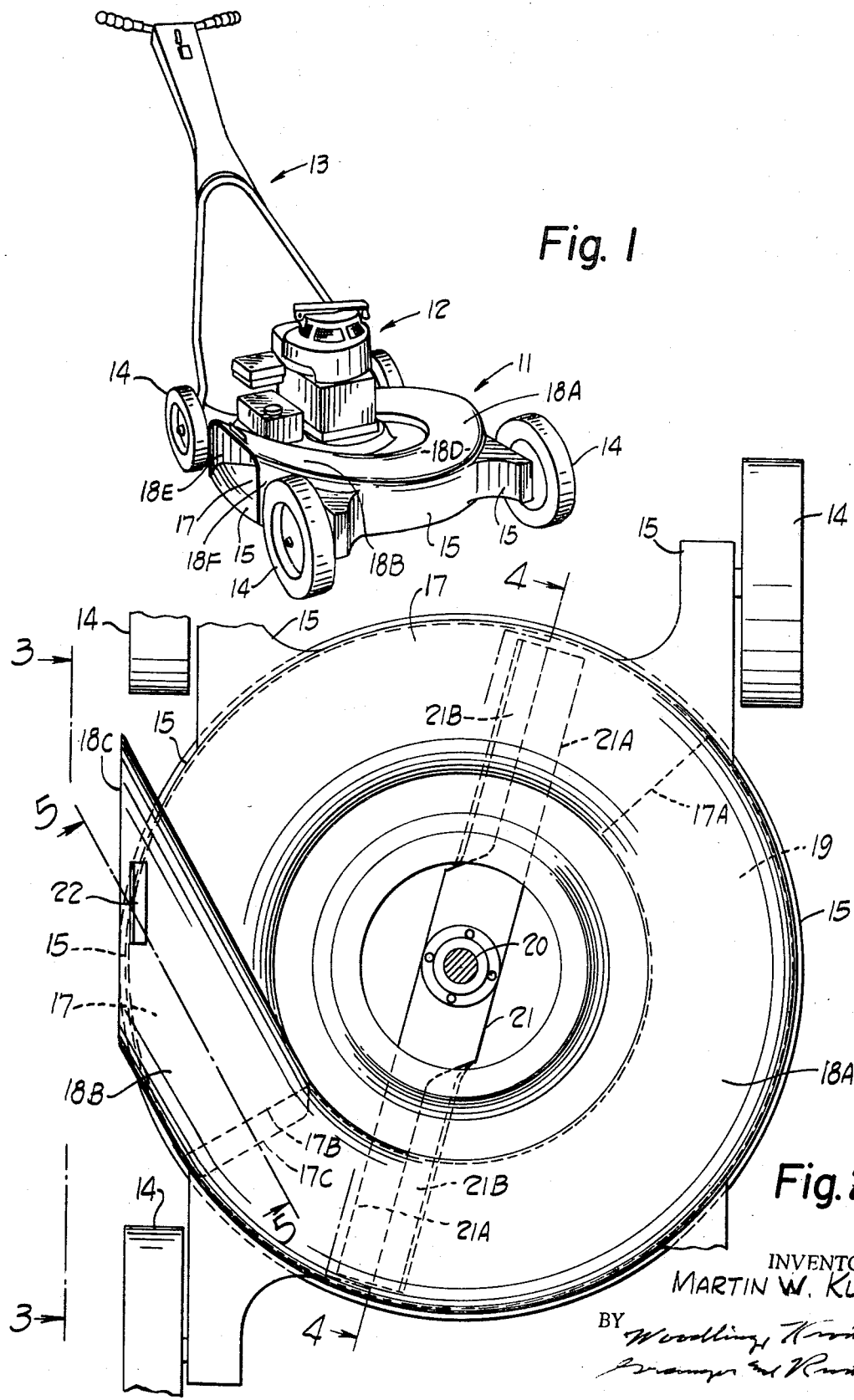

3,509,703
MOWER BLADE HOUSING
Martin W. Kunz, Parma Heights, Ohio, assignor to The M.T. & D. Company, a corporation of Ohio
Filed Aug. 22, 1967, Ser. No. 662,437
Int. Cl. A01d 35/26
U.S. Cl. 56—25.4          10 Claims

ABSTRACT OF THE DISCLOSURE

A rotary-type mower having a blade housing which has a side wall extending completely around the cutting chamber without a lateral discharge opening in the side wall and having a chute member extending gradually upward from the horizontal plane of the upper wall of the housing to receive cut grass thrown upwardly and tangentially by the rotative cutting blade which has a deflecting portion that deflects cut grass upwardly, the chute member having an arcuate portion over an arcuate open space in the upper wall of the housing and an extension portion extending tangentially and generally rearwardly of the housing, the extension portion over-lying and extending above the upper wall of the housing a distance sufficient to limit direct linear intrusion through the discharge end of the extension portion downwardly past the upper wall of the housing into the path of the rotative blade, and to thus improve safety in the use of the mower.

---

My invention relates to housing for a rotating blade on a lawn mower.

The new housing is directed toward increasing the safety in the use of a mower so as to limit or minimize the opportunity for intrusion of a foot or hand through the discharge opening of the housing into the path of the horizontal rotating blade. It also improves the safety in the use of such a mower by the restriction provided by the walls of the housing against stones and other objects being thrown by the blade outwardly of the mower housing and against a person who might be injured by the same.

In the drawing, FIG. 1 shows a mower having a housing embodying my invention;

FIG. 2 is an enlarged plan view looking down on the blade housing of the mower;

Figure 3:
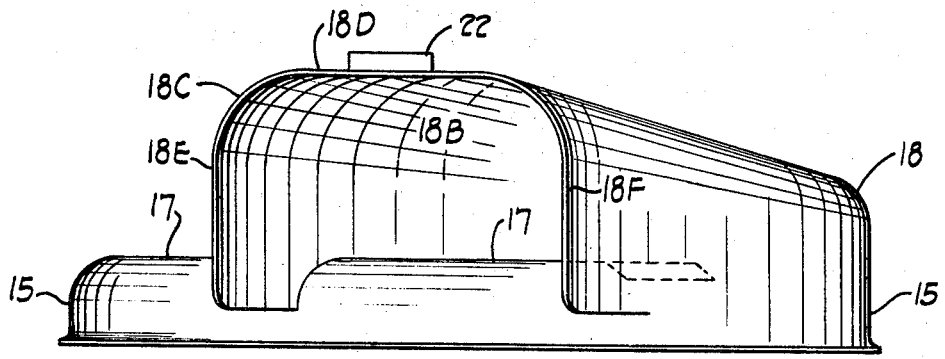
FIG. 3 is a side view of the blade housing looking in the direction of the arrow 3—3 of FIG. 2.
Figure 4:
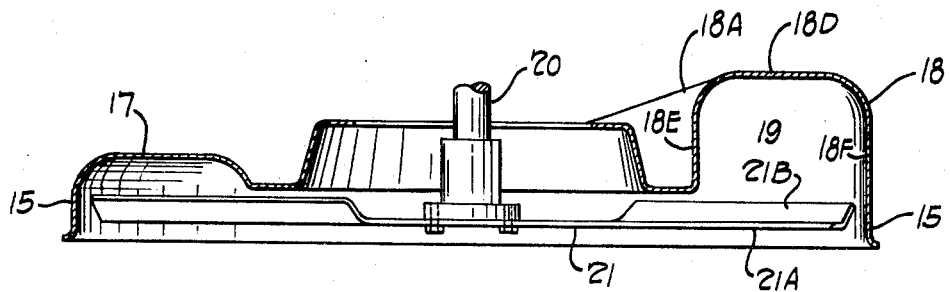
FIG. 4 is a cross-sectional view taken through the line 4—4 of FIG. 2.

The mower to which my invention is applied has a body or housing denoted generally by the reference housing 11 and upon which is mounted an engine 12. A handle control 13 is attached to the housing 11 in the usual manner. Four separate wheels 14 are mounted on brackets 15 secured in the usual manner to the housing or body 11.

It is to be noted that the improved housing 11 has a continuous circular side wall 15 extending therearound. This side wall 15 embraces or surrounds a rotating blade 21 disposed in a horizontal path by rotation of a shaft 20 powered by the engine 12. The blade 21 has an edge portion 21A disposed adjacent its opposite ends in the usual manner for cutting or severing grass in the path of the rotating blade. Adjacent and on the opposite side of each cutting edge 21A is a deflecting portion 21B inclined to throw grass and other material encountered by the blade upwardly and tangentially. Thus, cut grass and other material or objects are thrown generally upwardly and also outwardly against the side wall 15.

There is an upper horizontally disposed wall 17 which extends in a first arcuate sector of the blade housing and which is joined to the side wall 15 in a curved contour as illustrated in the drawing. This first sector of the housing over which the upper horizontal wall 17 is disposed is approximately half of the entire circumferential extent of the blade housing. This upper wall 17 terminates in a first terminal 17A which extends substantially radially of the annular housing 11. The other terminal of the arcuate upper wall 17 is denoted by the reference character 17B.

Between the first terminal 17A and the second terminal 17B there is an arcuate open space denoted by the reference character 19. Thus, the upper wall 17 extends about half of the circumferential extension of the housing and the open space 19 extends about the other half of the circumferential extension of the housing 11.

Disposed over and covering the open space 19 is a chute member 18 consisting generally of an arcuate portion 18A over the open space 19, and an extension portion 18B which extends tangentially of the annular housing from the arcuate portion 18A generally upwardly and rearwardly toward the discharge end 18C.

The chute member 18 rises in a gradual incline from the plane of the housing at first terminal 17A around the arcuate portion 18A, and along the extension portion 18B to the upper limit at the discharge end 18C. As seen in the drawing the chute member 18 has a top wall 18D from which depend downwardly the side walls 18E and 18F, side wall 18E being on the inner side of the chute member and side wall 18F being on the outer wall of the chute member. The side wall 18E extends rearwardly more than does the side wall 18D where the chute member at end 18C is cut off at an incline to a vertical plane through the axis of the extension portion 18B as illustrated in the drawing.

The edge of the upper wall 17, at a second terminal 17B, is turned down at a small angle for a short distance to from the downwardly inclined lip 17C which aids in guiding cut grass and other material thrown upwardly by the blade 21 to the level of the upper wall 17 within the extension portion 18B of the chute member. The lip portion 17C extends downwardly for a very short distance and avoids interference with the rotating blade 21. The angle of lip 17C coincides with an inclined line through the discharge end 18C at the upper edge thereof and the open space 19 adjacent the lip 17C at the lower edge thereof.

Figure 5:
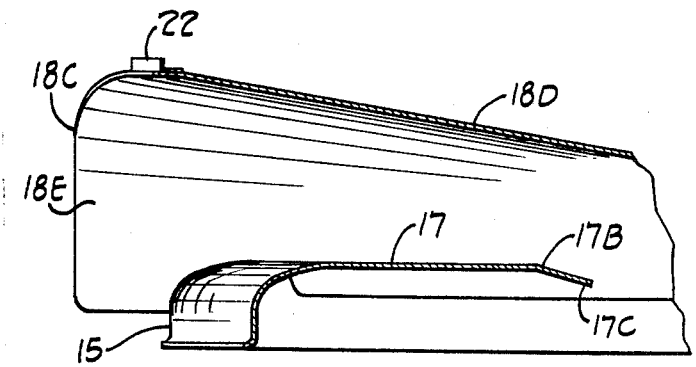
FIG. 5 is a cross-sectional view taken through the line 5—5 of FIG. 2.

It is to be particularly noted that the upper wall 17 with the extension portion 18B from the cylindrical outline of the outer side wall 15 to the second terminal 17B and its associated lip 17C extends a considerable distance longitudinally along the axis of the extension portion 18B. This considerable distance is substantially greater than is the height of the top wall 18D above the wall 17 at the location of the second terminal 17B. This assures that a hand or foot of the operator or other object intruding through the discharge end 18C into the extension portion 18B along a vertical plane coinciding with the axis of the extension portion in order to protrude below the second terminal 17B and its associating lift 17C toward the path of the blade 21 must be at a sharp small acute angle to the horizontal plane of the upper wall 17. Also this considerable distance relative to the length of a foot or hand discourages the insertion of a hand or foot through the chute member into the path of the rotating blade. This considerable distance thus provides an effective limit or barrier against accidental intrusion of a foot, hand, or other object into the path of the rotating blade, with resulting injury. The blade is surrounded on all sides by the side wall 15 of the housing and the opening through the chute member is in a plane considerably above the plane of the rotating blade. It is to be noted that in FIG. 5 the location of the second terminal 17B is such that the distance between the terminal 17B and the top wall 18D immediately above it is about one-half the distance from the location of the terminal 17B to where the outer wall 15 begins to curve downwardly, and approximately one-third the distance to the outer portion of the side wall 15. This distance effects a great barrier toward unwanted and unsafe intrusion into the housing from the side. The short circumferential length and the slight incline of the lip 17C, while helping to guide the upward move of cut grass and the like on the wall 17, does not substantially diminish or impair the guarding and protective advantages provided by the considerable distance from the wall 15 to the inner-most end of the wall 17 within the extension portion 18B of the chute member.

A bracket 22 may be mounted on the chute member adjacent its discharge end for supporting a grass collecting bag or the like.

It will be thus observed that by means of a unique structure for a blade housing including a chute member therewith, that safety is assured both against intrusion into the path of the blade and also by largely eliminating or preventing the outward throwing of stones or other objects from the discharge chute of the housing. A lifting and guiding action is provided for the cut grass whereby it is effectively and safely thrown outwardly and upwardly through the chute member for discharge from the discharge end 18C, either into the open or into a collecting bag.

The present disclosure includes that set forth in the dependent claims as well as that found in the foregoing description.

What is claimed is:

1. In a rotary mower having a motor-driven blade rotatable in a horizontal plane, a housing for said blade defining a cutting chamber, said housing comprising an annular member having an arcuate upper wall extending around a first arcuate sector of said annular member and disposed in a generally horizontal plane above the horizontal plane of the rotative movement of said blade, said annular member having a generally cylindrical outer wall extending substantially completely around the housing in the horizontal plane of said blade, said annular member in the horizontal plane of said upper wall having an arcuate open space around a second arcuate sector of said annular member, the termini of said upper wall at first and second circumferentially spaced locations defining first and second terminals of the said upper wall and the termini of said arcuate open space, a chute member having a top wall extending gradually upwardly in an incline from said upper wall of the annular member adjacent a said first terminal thereof and disposed above said open space in arcuate form to cover the same, said chute member having an extension portion extending tangentially of the annular member and generally rearwardly toward a discharge end in respect to forward movement of the mower, the top wall of said chute member over-lying said upper wall of the annular member a distance beyond said second terminal of the upper wall, said distance taken along a vertical plane through the axis of said extension portion being at least as great as the height of the top wall of the chute member above said second terminal to provide a baffle limiting intrusion through the discharge end of the chute member past the upper wall of the annular member into the path of said rotative blade.

2. A housing as claimed in claim 1, and in which said chute member has side walls extending downwardly from the top wall of the chute member to said annular member, the side wall of the extension portion on the outermost peripheral side extending rearwardly less than on the innermost peripheral side.

3. A housing as claimed in claim 1 and which the top wall and side walls of the chute member converge in curving form to avoid corners therebetween.

4. A housing as claimed in claim 1 and in which said discharge end of the chute member is disposed in a vertical plane at an acute angle to the axis of the said extension portion of the chute member, said vertical plane being inclined outwardly of the annular member.

5. A housing as defined in claim 1 and in which a line disposed in the vertical plane through the axis of the said extension portion and through the upper edge of the extension portion at the discharge and thereof and through the edge of the upper wall of the housing at said second terminal, is disposed at an acute angle to the horizontal plane of said upper wall.

6. In a rotary mower having a motor-driven blade rotatable in a horizontal plane, the blade having a cutting edge portion for cutting grass and a deflecting portion tending to cause cut grass to be thrown upwardly of the said horizontal plane and tangentially of the circular path of said rotatable blade, the improvement of a blade housing having a continuous outer generally cylindrical wall defining an annular cutting chamber cooperating with said rotatable blade for the cutting of grass, said outer cylindrical wall extending substantially completely around the housing in the horizontal plane of said blade, said housing having a horizontally-disposed upper wall joined to said outer wall and disposed over an arcuate sector of said cutting chamber, said upper wall having circumferentially spaced termini defining an arcuate space therebetween over said cutting chamber, a chute member having a top wall and downwardly depending walls, said chute member having an arcuate portion extending in an arcuate path over said arcuate open space and an extension portion extending from the arcuate portion tangentially of the housing toward a discharge end, the top wall of said chute member being gradually inclined upwardly through said arcuate portion and extension portion from a first terminal of the upper wall to said discharge end, said extension portion extending a distance beyond said second terminal of the upper wall to over-lie said horizontally disposed upper wall, said distance along a vertical plane through the axis of the extension portion being at least as great as the height of the said top wall of the chute member above the said upper wall at said second terminal to limit intrusion through the discharge end of the chute member past said upper wall into the path of said rotatable blade, said chute member guiding the tangential and upward throw of grass by the said blade toward said discharge end.

7. A housing as claimed in claim 6 and in which the said distance that the said extension portion extends beyond the second terminal of said upper wall is substantially greater along the downwardly depending wall along the side of the chute member radially inward of the housing than along the downwardly depending wall along the side of the chute member radially outward of the housing.

8. A housing as claimed in claim 6 and in which said top wall of the chute member joins the downwardly depending walls of the chute member in a gradual curve and devoid of corners in which cut grass being thrown through the chute member could lodge.

9. A housing as claimed in claim 6 and in which said chute member is disposed entirely above the horizontal plane of said upper wall, in which said second arcuate sector is approximately half of the total circumferential extent of the housing, and said chute member along the axis thereof from said first terminal around the arcuate portion thereof and along the extension portion to said discharge end is substantially greater in length than the arcuate length along said axis of said arcuate open space.

10. A housing as claimed in claim 6 and in which a line disposed in a vertical plane through the axis of the said extension portion and through the upper edge of the extension portion at the discharge end thereof and through the edge of the upper wall of the housing at said second terminal, is disposed at an acute angle to the horizontal plane of said upper wall.

References Cited

UNITED STATES PATENTS

| | | | |
|---|---|---|---|
| 2,719,396 | 10/1955 | Morris et al. | 56—25.4 |
| 2,957,295 | 10/1960 | Brown | 56—25.4 |
| 2,983,096 | 5/1961 | Phelps | 56—255 |
| 3,118,267 | 1/1964 | Shaw | 56—25.4 |

ROBERT PESHOCK, Primary Examiner